Figure 1:
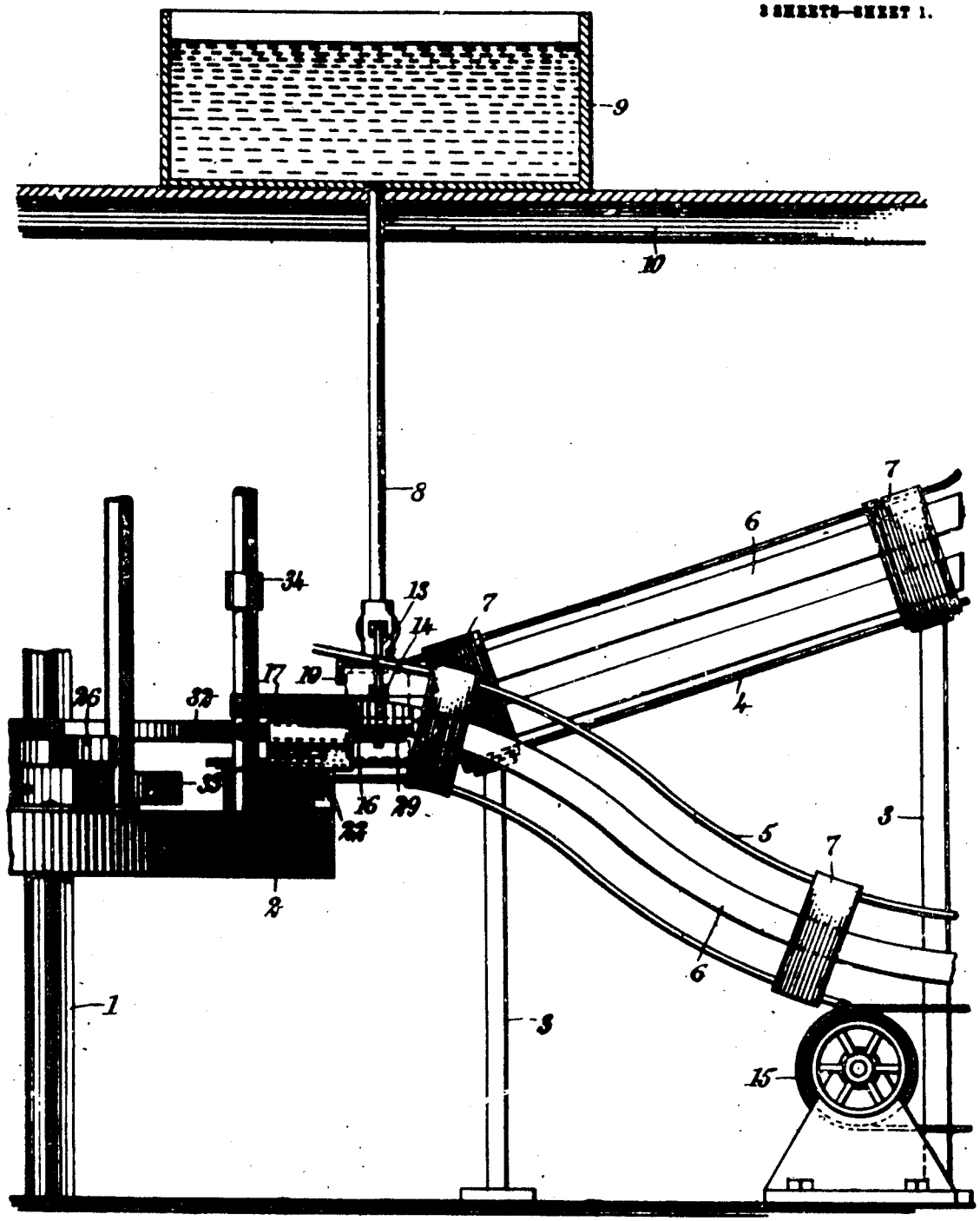

J. W. WHITE.
CAN FEEDING AND DELIVERING MECHANISM.
APPLICATION FILED MAR. 8, 1909.

955,731.

Patented Apr. 19, 1910.
3 SHEETS—SHEET 1.

WITNESSES

INVENTOR
John W. White
BY Munn & Co.
ATTORNEYS

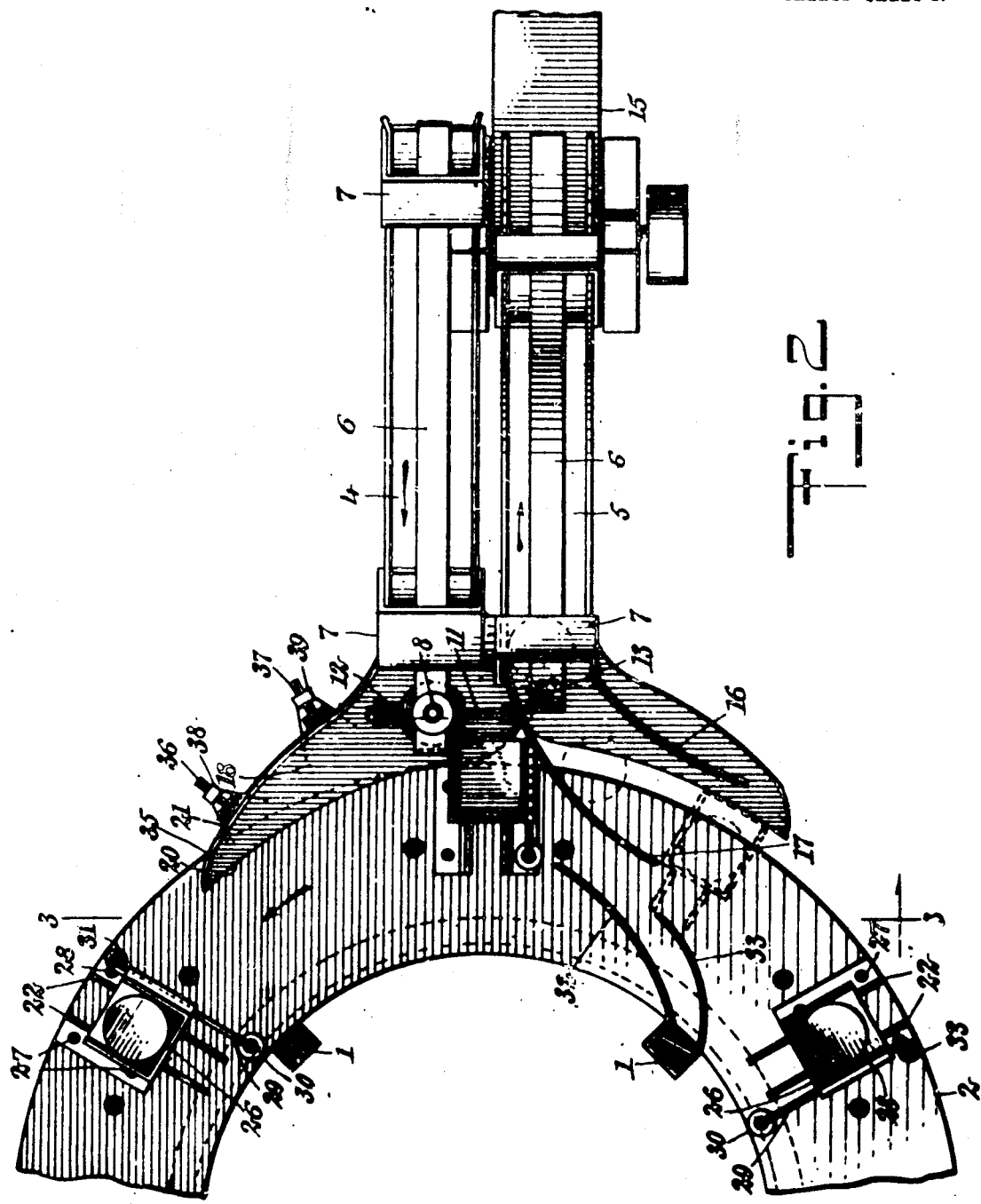

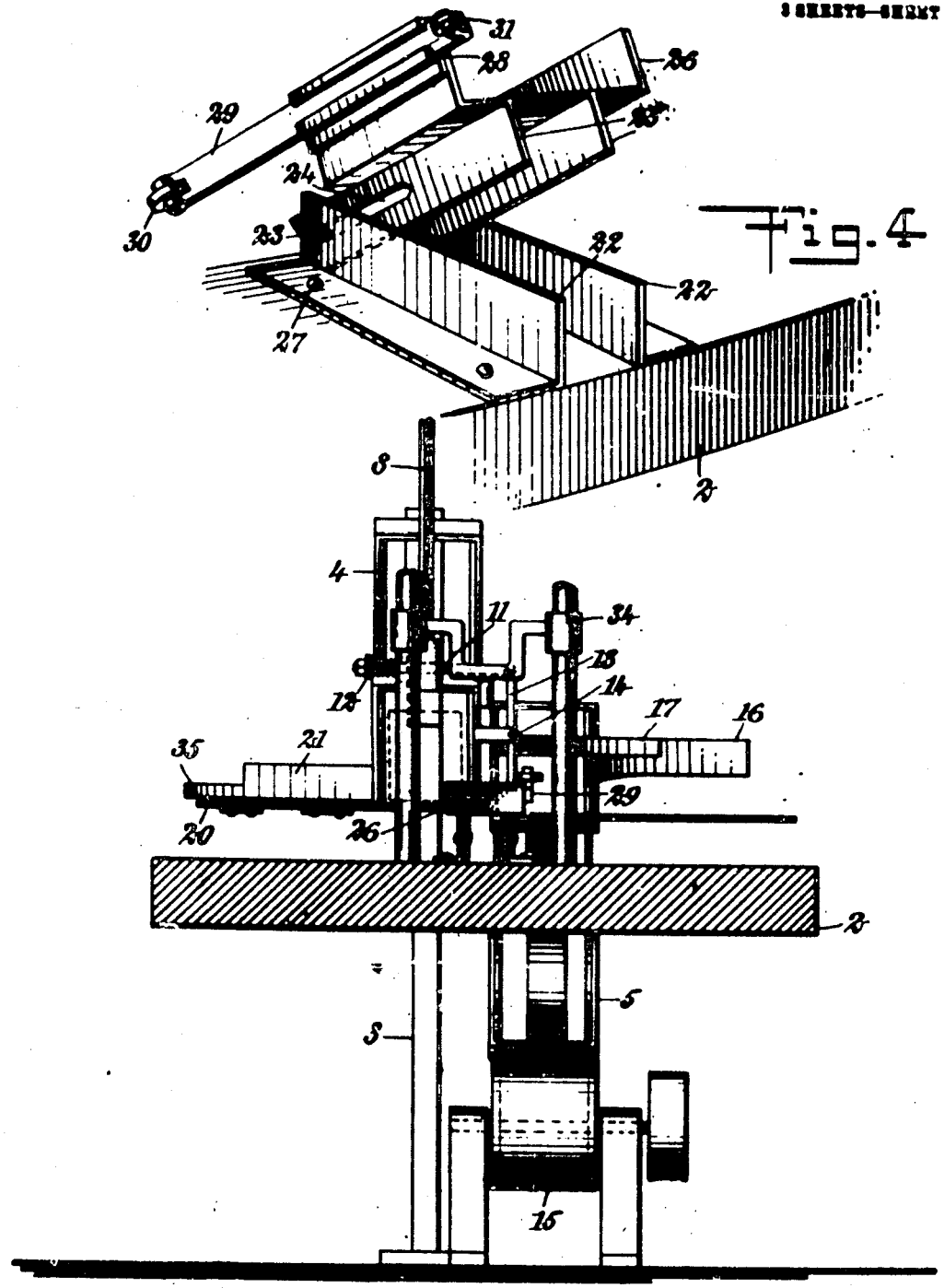

UNITED STATES PATENT OFFICE.

JOHN W. WHITE, OF KANSAS CITY, KANSAS, ASSIGNOR OF ONE-HALF TO CHARLES F. FROEHLICH, OF KANSAS CITY, KANSAS.

CAN FEEDING AND DELIVERING MECHANISM.

955,731.  Specification of Letters Patent. Patented Apr. 19, 1910.

Application filed March 5, 1909. Serial No. 481,254.

*To all whom it may concern:*

Be it known that I, JOHN W. WHITE, a citizen of the United States, and a resident of Kansas City, in the county of Wyandotte and State of Kansas, have invented a new and Improved Can Feeding and Delivering Mechanism, of which the following is a full, clear, and exact description.

This invention relates to a mechanism adapted to feed cans to and receive cans from a can-filling machine.

An object of this invention is to provide means for partially filling the cans on a stationary member, means for filling the cans on a movable member, means for removing the cans from the stationary member and accurately placing them onto the movable member so that they may be located in filling relation with the filling means connected to the movable member, and means for removing the cans from the movable member.

The invention consists, generally speaking, of a chute, can-filling mechanism connected to said chute, a rotatable table, can-feeding means connected to said table, sliding carriages on said table adapted to remove cans from said chute and so place them on said table that they will be located in communicating relation with said feeding means connected to said table.

The invention further consists in the construction and combination of parts, to be more fully described hereinafter and particularly set forth in the claims.

Reference is to be had to the accompanying drawings forming a part of this specification, in which like reference characters denote corresponding parts in all the views, and in which—

Figure 1 is a side elevation of the device, partly in section; Fig. 2 is a plan view, partly broken away; Fig. 3 is a vertical cross section on the line 3—3 of Fig. 2; and Fig. 4 is an enlarged perspective view of the carriage and ways, said carriage being partly tilted up.

Referring more particularly to the separate parts of the device, 1 is a frame adapted to rotatably support a table 2 of a can-filling machine. A frame 3 supports an inclined feed chute 4 and an inclined delivery chute 5, which are adapted respectively to feed cans to and receive cans from said table 2. These chutes may be of any suitable form and material, the chutes as shown being made of parallel slat bars 6, reinforced and held in shape by bands 7.

Connected to the feed chute 4 is a pipe 8, which is connected to a jelly tank 9 supported on the floor 10. This pipe has a valve 11 held closed by a spring 12 and operated by a rod 13 pivoted at 14. The operation of said rod will be more fully described hereinafter.

Connected to the lower end of the delivery chute 5 is an endless conveyer 15 which is of any suitable form and material, and is adapted to receive the filled can from said delivery chute and also may be driven from the table 2 in any suitable manner. The sides of the delivery chute 5 extend over the table 2 in the form of curved guiding arms 16 and 17, and are adapted to guide the can from the table to the chute.

The feed chute 4 has a bottom 18 which extends over the table 2, and also has a downwardly-extending can-retaining flange 19. The bottom 18 has a cam-edge 20 and a cam-flange 21, the operation of which is to be more fully described hereinafter.

The table 2 has at suitable intervals, ways 22, to which are slidingly pivoted carriages 26 by means of guiding pins 23 in slots 24 in the flanges 25 depending from said carriages 26. The ways 22 are adjustable toward each other by means of screws 27, in order to convey different sized carriages. The carriages 26 are in the form of a box, open at one end, and may be of any suitable size and material such as will readily hold a can therein. Extending from one of the sides of each carriage is a guide-way 28, through which slides an arm 29 having rollers 30 and 31 suitably supported on its inner and outer ends. The arm 29 is preferably made removable from the guide 28 for a purpose to be described hereinafter, by having the guide 28 formed with the slot at its outer surface of sufficient size to permit the roller 31 and its bearings to pass through. The inner roller is adapted to co-act with a spring-cam surface 32 suitably supported on the frame 1 adjacent to the delivery chute 5. This cam surface 32 is adapted to force the arm 29 outwardly, so that it will be in a position to operate the valve rod 13. Also connected to the frame 1 at this point is a spring cam 33 which co-acts with the back extensions of the flanges 25 on the carriage 26, and serves to force said carriage outwardly to a position in which the guide-arm 17 will come in play. The front edges of the flanges 25 co-act with the cam-edge 20 to force the carriage back into place and the cam-surface 21 co-acts with the roller 31 to force the arm 29 back in place.

34 represents a can-stuffing machine of any suitable form, one of which is provided for each of said carriages, and are supported on suitable guides located at either side of each carriage, adapted to force meat or other material into the can.

The cam-surface 21 has, extending from it and conforming with the back edge of the bottom 18, a cam-lip 35. This cam-lip 35 does not extend as high as the cam surface 21, and permits the arm 29 to sweep over it. Thus the arm 29 is enabled to sweep the can along, while the cam-lip 35 forces said can upon the carriage 26. The cam-surface 21 together with its cam-lip 35, is adjustable in and out, for different-sized cans, by means of adjusting screws 36 and 37, connected in any suitable manner to the cam surface 21, and adapted to be screwed in and out of supports 38 and 39 secured in any suitable manner to the frame.

In the operation of the device, the empty cans are conveyed to the chute 4 by any suitable means, and they slide down until the foremost one comes in contact with the retaining flange 19, which serves to hold the cans from further travel in a direct line.

The table 2 is rotated by any suitable means, and serves to move one of the carriages so that the sliding arm thereon is brought into contact, by means of its inner roller 30, with the cam 32, which forces said arm outwardly into a position in which it is adapted by further movement of the table to engage the valve-operating rod 13, to open the valve 11 and allow jelly to flow into the waiting can. The table carries the arm 29 farther around, and it snaps by the end of the valve lever 13, allowing the valve to close, and sweeps the can along the bottom 18 of the chute 4 until the cam surface 21 and its cam-lip 35 force the can onto the carriage and at the same time the cam surface 21 forces the arm 29 back into its original position. The cam edge 20 on the bottom 18 co-acts with the front edges of the flanges 25 on the carriage 26 and forces said carriage back into its original position. The stuffing machine 34 then operates in any suitable manner to fill the cans with meat or any other suitable material. The continued rotation of the table brings the rearwardly-extending flanges 25 on the carriage 26 into contact with the spring cam 33 and forces said carriage outwardly into such a position that the guiding side 17 will scoop the filled can off the carriage and onto the chute, whence it slides down to the conveyer 15, and is carried away for further treatment.

The arms 29 are so connected to the carriages 26, that they may be easily removed so that some of the carriages 26 may have no means for sweeping the cans onto them. Thus the number of working carriages on the table may be varied.

Having thus described my invention, what I claim as new and desire to secure by Letters Patent is:—

1. In a device of the class described, the combination with a feed chute, of a delivery chute, a moving table, and a sliding carriage on said table, said carriage being adapted to take cans from said feed chute and deliver them to said delivery chute.

2. In a device of the class described, the combination with a feed chute, of a delivery chute, a moving table, a sliding carriage on said table, said carriage being adapted to take cans from said feed chute and deliver them to said delivery chute, and a filling mechanism operated by said carriage.

3. In a device of the class described, the combination with a frame, of a feed chute, a delivery chute, a table connected to said frame, a carriage on said table, means on said frame adapted to force said carriage outward, and means connected to said feed chute adapted to force said carriage inward.

4. In a device of the class described, the combination with a frame, of a table connected to said frame, a feed chute adapted to feed cans to said table, a delivery chute adapted to receive cans from said table, a sliding carriage on said table, means on said carriage adapted to move cans from said feed chute, and means on said frame adapted to extend said last-mentioned means.

5. In a device of the class described, the combination with a frame, of a rotatable table connected to said frame, sliding carriages on said table, a feed chute adapted to feed cans to said carriages, a delivery chute adapted to receive cans from said carriages, can-filling means connected to said feed chute, and means on said carriages actuated by said frame adapted to co-act with said can-filling means.

6. In a device of the class described, the combination with a frame, of a rotatable table, a feed chute, a delivery chute, a sliding carriage on said table, a cam on said frame adapted to move said carriage, and a cam on said feed chute adapted to engage said carriage.

7. In a device of the class described, the combination with a frame, of a rotatable table connected to said frame, a feed chute adapted to feed cans to said table, a can-filler connected to said feed chute, a moving carriage on said table adapted to be moved outwardly by said frame, a sliding arm on said carriage adapted to be moved outwardly by said frame, means on said delivery chute adapted to remove cans from said carriage, means on said can-filler adapted to co-act with said sliding arm, means on said feed chute adapted to move said carriage inwardly, and means on said feed chute adapted to move said sliding arm inwardly.

8. In a device of the class described, the combination with a frame, of a rotatable table connected to said frame, a feed chute for said table, a tank, a pipe connecting the tank to said feed chute, a valve in said pipe, a valve-operating rod connected to said valve, carriages sliding in ways on said table, a cam on said frame adapted to force said carriages outwardly, a cam on said feed chute adapted to force said carriages inwardly, sliding arms on said carriages adapted to co-act with said valve-operating rod, inner and outer rollers on said arms, a cam on said frame adapted to engage said inner rollers and force said arms outwardly, a cam on said feed chute adapted to engage said outer roller and force said arm inwardly, a delivery chute adapted to receive cans from said table, and a guiding arm on said delivery chute adapted to remove cans from said carriage.

9. In a device of the class described, the combination with a frame, of a table connected to said frame, ways on said table, a carriage adapted to slide on said ways, guiding-pins on said ways, said carriage having guiding slots therein pivotally engaging said pins.

10. In a device of the class described, the combination with a frame, of a table connected to said frame, ways on said table, a carriage adapted to slide in said ways, an arm slidingly connected to said carriage, and cams on said frame adapted to co-act with said carriage and said frame.

11. In a device of the class described, the combination with a frame, of a table connected to said frame, adjustable ways on said table, a carriage adapted to slide on said ways, and means on said frame adapted to co-act with said carriage.

12. In a device of the class described, the combination with a frame, of a table rotatably supported by said frame, ways on said table, a carriage adapted to slide on said ways, guiding pins on said ways, and depending slotted flanges on said carriage adapted to run between said ways and slidingly pivoted to said guiding pins.

13. In a device of the class described, the combination with a stationary member, of means on said member adapted to partially fill a can, a movable member, means adapted to transfer cans from said stationary member to said movable member, and means connected to said movable member adapted to complete the filling of said can.

14. In a device of the class described, the combination with a chute, of a rotatable table juxtaposed to said chute, means on said chute adapted to partially fill a can, means for transferring said can to said table, and means connected with said table adapted to complete the filling of said can.

In testimony whereof I have signed my name to this specification in the presence of two subscribing witnesses.

JOHN W. WHITE.

Witnesses:
Geo. J. Butz,
John Foster.